Patented Oct. 14, 1947

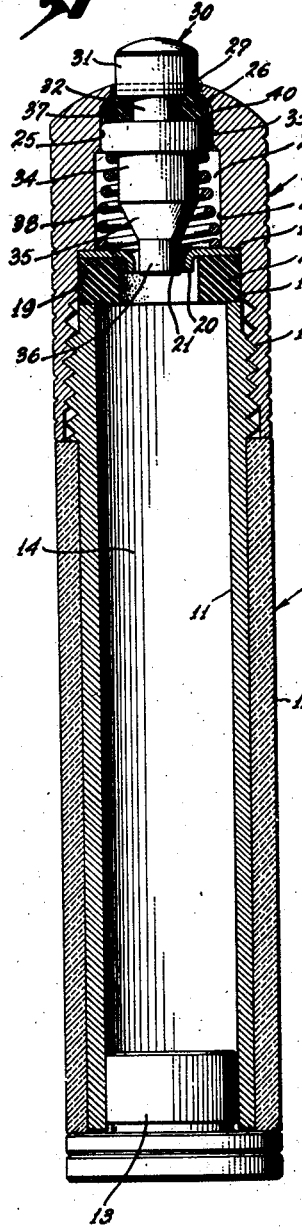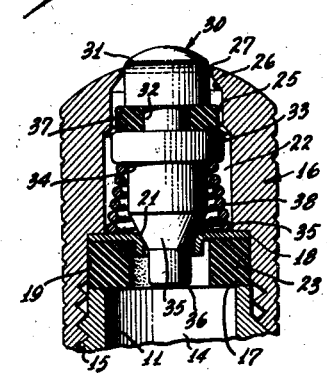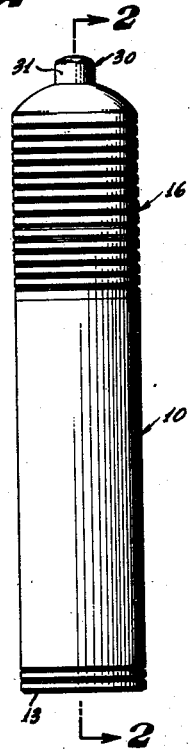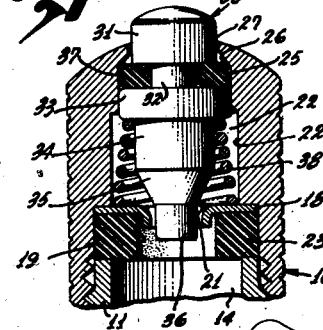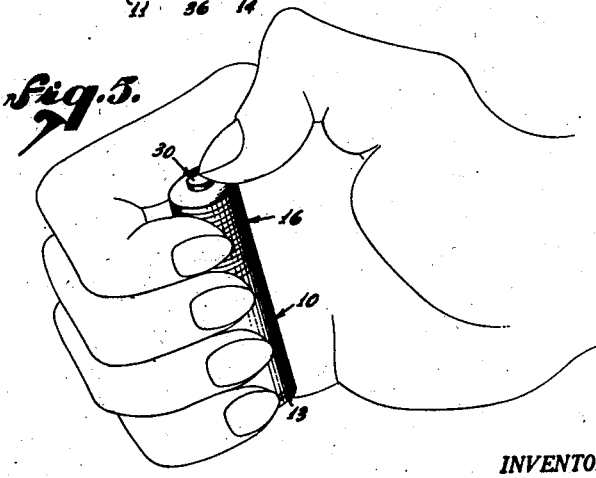
INVENTOR:
MAURICE (W) TRAPET.
BY
ATTORNEYS.

2,429,003

UNITED STATES PATENT OFFICE 2,429,003

LIQUID DISPENSING DEVICE, WITH TRAP CHAMBER CUTOFF, AXIALLY SLIDABLE ONLY

Maurice Trapet, Los Angeles, Calif.

Application May 12, 1947, Serial No. 747,349

6 Claims. (Cl. 222—453)

This invention relates to improvements in liquid dispensing containers and has particular utility, for example, in dispensing perfume. The present application is a continuation in part of my co-pending patent application Serial No. 636,735, filed December 22, 1945, for Perfume dispensing containers.

One of the important objects of the invention is to provide a leak-proof pocket-type liquid container having a novel dispensing head with valve arrangement by which the user is able to release or withdraw or spray a predetermined amount of the contained liquid product whenever desired and without removal of the container refill cap.

Another object of the invention is to provide a pocket-type dispensing container for perfume or other aromatic liquid, which container can be conveniently carried in the purse or pocket without liability of leakage, which is always available for the dispensing of the liquid by a simple manipulation and without the necessity of removing any safety covers or the like, and by the use of which desired quantities of the contained liquid may be withdrawn or sprayed by means of the novel dispensing head and without exercising special care or precaution to prevent excess flow therefrom.

A further object of the invention is to provide a convenient, efficient, compact and leak-proof pocket-type dispensing container for fluids embodying the foregoing mentioned novel features, which container will prevent waste and undue evaporation and therefore effect substantial savings for its owner in replacement costs of the contained material.

The dispensing head itself is thought to present novelty and utility, whether coupled with the tubular type of liquid reservoir shown and described or provided for use with some other form of reservoir, as it is primarily by the dispensing head that the objects of the invention are realized.

Prior devices have been disclosed intended for the general purpose of the convenient manual dispensing of perfumes and other cosmetic liquids. Various defects or shortcomings have been noted in these prior art devices. Certain ones are complex and therefore expensive to manufacture, whereas the device of the present invention is relatively simple and inexpensive to manufacture. Certain of the prior art devices lack elements necessary to dispense a predetermined given amount of liquid while sealing off the bulk of the material contained in the device during the dispensing operation, whereas my improved dispenser enables the user to dispense a measured or limited amount of the liquid while the major reservoir is sealed off, or even without sealing off the reservoir. Some of the prior devices known to the trade require a safety cap to be screwed on to the end of the dispenser as a precaution against undesired leakage of the liquid contents when the dispenser is not in use. The construction of my invention does not require any such safety cap. There is within my knowledge no prior art device of this character which can be manipulated either to flow the liquid contents from the dispenser or cause it to spray or spurt the liquid. The prior liquid dispensers which can be used to flow the contents out will not spray or spurt, and the conventional atomizer can not be manipulated to flow liquid therefrom. Moreover, the conventional atomizer commonly requires a source of air pressure which increases the cost as well as well as the bulk of the device. My improvement incorporates the means for spraying or spurting the liquid without the use of any auxiliary air pressure source. The foregoing distinctions over the prior art devices may be considered as pointing out particularized objects of the invention.

An additional more detailed object is to provide in a device of the character described, a small liquid trap near the discharge orifice which will under proper manipulation of the device, store small quantities of liquid to be sprayed through the orifice.

These and other objects of the invention will become more apparent from a consideration of the description of the device taken in conjunction with the drawing.

In the drawing:

Figure 1 is a vertical side elevation of a form of the dispensing container of this invention chosen for illustration.

Figure 2 is an enlarged longitudinal section through the device showing the dispensing control valve closed.

Figure 3 is a fragmentary sectional view of the upper end of the device similar to the illustration of Figure 2 showing the dispensing control valve open, as in fully depressed position, and the reservoir control valve closed.

Figure 4 is a view similar to Figure 3 illustrating the valve assembly in an intermediate position.

Figure 5 is a perspective view of the dispenser shown in Figure 1 illustrating one manner of manipulating the device for spurting or spraying small quantities of liquid.

The reference numeral 10 indicates a hollow cylindrical container, the core 11 of which can be made of light metal or other suitable material impervious to moisture. As shown for illustrative purposes only the core 11 may be enclosed within a sleeve 12 of colored synthetic resin or any other decorative material. Obviously the core and sleeve may be formed as a single piece, and the exterior may be polished or enameled as may be desired for decorative appearance. The container 10 has one end permanently closed, as for example, by a stop 13 press fitted into the end. Obviously I could substitute for the stop 13 a closed end formed integrally with the other material of the container. Thus is provided a liquid reservoir 14.

The upper end of the container 10 is externally threaded as at 15 to receive an internally threaded hollow cap 16. The extreme upper end of the container 10 provides an annular seat 17.

A specially formed circular metal washer 18 is press fitted in the cap 16, the latter being preferably formed with an annular recess 19 in which the washer is disposed. This washer is provided with a downwardly protruding annular central flange 20 so joined to the horizontal portion of the washer as to provide a somewhat conical valve seat 21. The flange 20 affords a circular passage from the reservoir 14 communicating with a liquid dispensing chamber 22 within the cap 16. A circular gasket 23, preferably composed of rubber or other suitable resilient sealing material, is interposed between the washer 18 and the annular seat 17 at the upper end of the container, providing a leak-proof seal without obstructing communication between the reservoir 14 and the dispensing chamber 22. This gasket 23 is preferably, although not essentially so, retained within the recess 19 by being made with its outer diameter larger than the diameter of the recess 19 so that friction holds it in place, whereby it remains with the cap when the cap is removed from the container to refill the reservoir or for any other purpose. If desirable or necessary the gasket may be cemented to the wall of the recess 19 or to the under surface of the washer 18 or to both.

The chamber 22 previously referred to is defined in part by the interior annular wall section 22a of the cap 16, which is cylindrical in form. At the upper end of this cylinder is a bore 25 of lesser diameter than that of the cylinder 22. The intersection between the bore 25 and the cylinder 22 is chamfered to guide a plunger element which is hereafter described. Commencing at the upper end of the bore 25 is a conical valve seat 26 which terminates in an annular dispensing orifice 27. The lip which defines the orifice does not function in closing off or sealing the dispenser. In view of that, and for reasons which will be subsequently explained, it is desired that the metal or other material at the lip of the orifice be relatively thin immediately adjacent the orifice. As an example of what is meant by relatively thin, the proportions illustrated in the drawing, which is taken from an operative commercial specimen, have been found satisfactory. The specimen was of a size convenient to handle, being approximately 2¾" long, and approximately ½" in diameter. These dimensions are mentioned only as an example. The size may vary widely depending on the intended use.

A preferably unitary plunger-valve element 30, the main portion of which is disposed within the cap 16, comprises the following parts: A manually depressible control button 31, a plunger 33 spaced therefrom and providing a gasket recess 32, a cylindrical body 34, a tapered valve 35 and a cylindrical guide stem 36. Within the recess 32 is retained a gasket 37 made of rubber, or other suitable material and preferably of substantially rectangular cross section. A compression spring 38 rests at its lower end against the washer 18 and presses at its upper end against the lower surface of plunger 33.

The plunger has a reasonably snug sliding fit in the bore 25, the guide stem 36 is of such diameter as to provide free fluid travel through the passage defined by the flange 20, and the control button 31 is loosely slidable through the orifice 27, there being sufficient clearance between the button 31 and the wall of the orifice to permit the flow of liquid therebetween, but the lip of the orifice providing a guide for longitudinal movement of the button 31.

The outer diameter of the gasket 37 is preferably less than the diameter of the bore 25 whereby a liquid trap 40 is formed as shown particularly in Figures 2 and 4.

The exact pressure of the spring 38 may vary according to the general mechanical design of the dispenser, but it is important in exemplifying this invention that such spring have sufficient pressure to completely seal off the liquid from discharge through the orifice 27 when the device is not in use so that ordinary pressure against the control button 31, as for example might occur when the dispenser is jostled about in a lady's purse, will not unseat the closing valve. In actual practice it has been found that a spring pressure of approximately two and a half pounds per square inch in a dispenser of a size to be conveniently carried in a lady's purse, that is to say in the neighborhood of two and three-fourths inches long and one-half inch in diameter, is satisfactory. This is stated by way of example only and not by way of limitation.

In use, the reservoir may be filled with perfume or other liquid by unscrewing the cap 16 and pouring the liquid into the top of the container 10. The cap is then screwed down onto the container tightly so that the gasket 23 is compressed against the upper end of the container. The spring 38 normally urges the plunger valve element 30 upwardly, whereby the gasket 37 is compressed against the tapered portion 26 of the cap, thereby sealing off the orifice 27.

If it is desired to discharge a measured amount of perfume, such as may be contained in the chamber 22, the dispenser can be inverted and pressure applied against the control button 31 either with the thumb or finger or by pressing the control button directly upon an object, as for example the person or clothing. Assuming that the button is fully depressed, as illustrated in Figure 3, the passage between the reservoir 14 and the dispensing chamber 22 is closed off and (the dispenser being inverted) the liquid contained in the dispensing chamber 22 will then flow past the plunger 33, the gasket 37 and the orifice 27 as restricted by the button 31. When the liquid has been exhausted a repeat operation may be performed by releasing the pressure on the button 31 and again depressing it.

If more than the amount of liquid contained in the chamber 22 is desired the control button may be depressed far enough to open the passages for flow of the liquid through the orifice, but not far enough to fully close the valved passage between the chambers 22 and 14.

If less than the full contents of the auxiliary chamber 22 are desired, whatever amount is desired to be discharged can be released by a pressure on the button 31 for sufficient a length of time to permit the liquid to escape through the orifice. The tapering form of the valve 35 permits a desired variation of the volume of flow through the dispensing orifice 27 depending on the extent that the valve 35 enters the valve seat 21.

An important feature of the invention is the means by which small quantities of the liquid may be sprayed or spurted upon an object, which effects an economical use of the perfume or other liquid and a dispersion of a small given amount over a larger surface. This can be done with the dispenser in inverted position, or if it has been inverted and returned to upright position the spraying or spurting can be accomplished with the dispenser in either an upright or an inclined position. Actual demonstration of the device shows this.

The operation is to depress the control button preferably with the thumb, as for example illustrated in Figure 5, and abruptly release it by slipping the thumb sidewise. The spring will cause the plunger 33 and gasket 37 to advance rapidly with a snapping action and minute droplets will be forcibly propelled through the restricted orifice 27 and dispersed in a diverging pattern. Even in upright position, assuming that the dispenser has been inverted and that drops remain on the wall of the chamber 22 and in the annular trap 40 between the gasket 37 and the bore 25, the plunger 33 exerts a scrubbing action on the inside wall of the stepped passage, and in the final closing movement the gasket 37 scrubs the conical valve seat 26 and aids in the ejection of liquid. The result described is found even without a plunger 33 of sufficient diameter to contact the wall of the bore 25, as for example illustrated in the copending application Serial No. 636,735 above referred to. However, the result is improved by the cooperative function of the plunger 33 scrubbing the wall of the bore 25 as illustrated and explained in the present application.

It will be noted that the gasket 37 itself performs some function as a plunger in that it makes contact with the tapered valve seat 26 and slides therealong for a short distance before coming to rest in the fully closed position.

The spraying or spurting action may be due in part to rapid compression during the snap back motion of the plunger-valve element 30 of a combination of drops of the fluid in the trap with a small column of air which has entered the head while the control button was depressed, and this pressure is obviously increased when the action progresses to the area of the restricted discharge orifice. The same action takes place under similar manipulative condition regardless of the angle at which the dispenser is held, and the availability of this spraying or spurting characteristic in the present device without employing conventional atomizing structures is a novel feature of great desirability on occasions when the operator wishes to put the device to such use.

Thus the device fulfills the special object of preventing excess flow by means of a single, simple, unitary, fast-acting control in the absence of the user's intention to drain out the entire charge of liquid stored in either the auxiliary chamber 22 or the reservoir 14, and any necessity for exercising special caution to prevent excess discharge which might result in waste is definitely eliminated.

It will furthermore be evident that every provision has been made in the present device to render the same foolproof against accidental or careless handling, the valve structure and sealing arrangement positively preventing leakage or undue evaporation of the contents of the device during non-use, so that it can be carried about on the person of the user in association with other beauty aids whenever desired, or otherwise layed aside in any position without danger of objectionable consequences.

Since it is the customary practice among users of perfumes and similar aromatic liquids to apply what may be termed a standard measure of such liquid to a portion of their person or apparel at certain times, it is one purpose of the invention to supply a dispensing container for this use in which the dispensing chamber 22 is of a capacity which will result in dispensing the exact measured amount of aromatic liquid desired each time the full movement of the valve assembly 30 is undertaken by the user.

It will be evident that by the use of this novel device the contained fluid may be directly applied to any area to be perfumed simply by touching the button 31 to such area while holding the container 10 in inverted position and supplying the required degree of pressure which will result in one of the dispensing operations above described, or by using manual pressure against the button 31 after the fashion illustrated in Figure 5 with the dispenser either upright or inverted or oblique.

While I have illustrated and described the complete dispenser it will be obvious that novel features of the invention are contained in the cap which itself is a complete device attachable either to a container of the character illustrated and described or to a container of some other form provided with a suitable open top or mouth externally threaded for attachment of the cap.

While the advantages of the invention are particularly realized in the dispensing of perfume, toilet water, hand lotion and other cosmetic and beauty aid liquids, the device also has utility in dispensing talcum powder and other finely divided material.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having thus described my invention, what I claim and desire to secure by Letters Patent is:

1. A liquid dispensing container comprising a reservoir, a dispensing chamber, and a communicating passage therebetween, a first valve means to open and close said passage, a cylindrical bore communicating with and of lesser diameter than said dispensing chamber, a piston normally disposed in and slidably engaging the wall of said bore, a discharge orifice communicating with said bore and of lesser diameter than said bore, a second valve means to open and close said orifice, a button slidable in said orifice, said button having a diameter sufficiently less than the diameter of the orifice to provide a passage for liquid through the orifice past the button, said button, both said valve means and said piston being interconnected for unitary movement, and the piston and second valve means being so spaced that, on advancing after retraction, the piston enters the bore before the second valve means closes the orifice, and a spring supported in said dispensing chamber urging said second valve means closed, whereby when the button is depressed to one extreme the first said valve means closes said first mentioned passage and the second said valve means opens said orifice, and when said button after being depressed is abruptly released, said piston will forcibly propel liquid on the wall of said bore outwardly through said orifice, and when the extreme outward position of said button is reached said second valve means will close said orifice and said first valve means will open said first mentioned passage.

2. A liquid container dispensing head comprising a cap adapted to be attached to a container, said cap having a cylindrical bore, a piston normally disposed in and slidably engaging the wall of said bore, a discharge orifice communicating with said bore and having its center coincident with the longitudinal axis of said bore, valve means to open and close said orifice, said cap being formed with a liquid passage having walls spaced transversely away from said piston, and said passage extending from the container end of said cap to and terminating at said bore, said piston being reciprocable longitudinally of said passage, whereby when the piston is advanced it enters the bore and closes off the passage at the bore, and when said piston is depressed longitudinally of said passage the passage is opened and liquid can pass around said piston through said passage and enter said bore, a button slidable in said orifice said button having a diameter sufficiently less than the diameter of the orifice to provide a restricted passage for liquid through the orifice past the button, a spring urging said valve means closed, means supporting said spring, said button, piston and valve means being interconnected for unitary movement whereby when the button is depressed to one extreme the piston opens the first named passage and the valve means opens the orifice, and when the button is abruptly released after being depressed the piston will forcibly propel any liquid in the bore outwardly through the orifice.

3. A liquid container dispensing head comprising a cap adapted to be attached to a container, said cap having a dispensing chamber, a cylindrical bore communicating with and of lesser diameter than said dispensing chamber, a piston normally disposed in and slidably engaging the wall of said bore and the piston being depressible into said dispensing chamber to a point where it is free of said bore in which position liquid can pass around said piston and enter said bore, a discharge orifice communicating with said bore and having its center coincident with the longitudinal axis of said bore, valve means to open and close said orifice, a button slidable in said orifice said button having a diameter sufficiently less than the diameter of the orifice to provide a restricted passage for liquid through the orifice past the button, a spring urging said valve means closed, means supporting said spring, said button, piston and valve means being interconnected for unitary movement and the piston and valve means being so spaced that, on advancing, the piston enters the bore before the valve means closes the orifice whereby when the button is depressed to one extreme the piston is free of the bore and the valve means opens the orifice, and when the button is abruptly released after being depressed the piston will forcibly propel any liquid in the bore outwardly through the orifice.

4. A liquid container dispensing head comprising a cap adapted to be attached to a container, said cap having a dispensing chamber, a cylindrical bore communicating with and of lesser diameter than said dispensing chamber, a piston normally disposed in and slidably engaging the wall of said bore and the piston being depressible into said dispensing chamber to a point where it is free of said bore in which position liquid can pass around said piston and enter said bore, the outer end of said cylindrical bore being conically reduced forming a discharge orifice, valve means including a resilient gasket adapted to be compressibly wedged against said conical section to close said orifice and disengageable from said conical section to open said orifice, a button slidable in said orifice said button having a diameter sufficiently less than the diameter of the orifice to provide a restricted passage for liquid through the orifice past the button, a spring urging said valve means closed, means supporting said spring, said button, piston and valve means being interconnected for unitary movement and the piston and valve means being so spaced that, on advancing, the piston enters the bore before the valve means closes the orifice whereby when the button is depressed to one extreme the piston is free of the bore and the valve means opens the orifice, and when the button is abruptly released after being depressed the piston will forcibly propel any liquid in the bore outwardly through the orifice.

5. A liquid container dispensing head comprising a cap adapted to be attached to a container, said cap having a dispensing chamber, a cylindrical bore communicating with and of lesser diameter than said dispensing chamber, a piston normally disposed in and slidably engaging the wall of said bore and being depressible into said dispensing chamber, a discharge orifice communicating with said bore and having its center coincident with the longitudinal axis of said bore, valve means to open and close said orifice, said valve means including a resilient gasket of greater diameter than the orifice and of lesser diameter than the piston and located forward of the piston whereby a liquid trap is formed by the cooperative relationship of said bore, piston and gasket when the piston and gasket are in advanced position, the dispensing chamber forming a liquid passage in said cap around said piston extending from the container end of said cap into said bore, said passage being interrupted by the piston when said piston is advanced into the bore and open when said piston is depressed into the dispensing chamber whereby liquid can pass around said piston and enter said bore, a button slidable in said orifice, said button having a diameter sufficiently less than the diameter of the orifice to provide a restricted passage for liquid through the orifice past the button, a spring urging said valve means closed, means supporting said spring, said button, piston and valve means being interconnected for unitary movement whereby when the button is depressed to one extreme the piston opens the first named passage and the valve means opens the orifice, and when the button is abruptly released after being depressed the piston will forcibly propel any liquid in the trap outwardly through the orifice.

6. A liquid container dispensing head comprising a cap adapted to be attached to a container, said cap having a dispensing chamber, a cylindrical bore communicating with and of lesser diameter than said dispensing chamber, a piston normally disposed in and slidably engaging the wall of said bore and being depressible into said dispensing chamber to a point where it is free of said bore in which position liquid can pass around said piston and enter said bore, the outer end of said cylindrical bore being conically reduced forming a discharge orifice, valve means including a resilient gasket adapted to be compressibly wedged against said conical section to close said orifice and disengageable from said conical section to open said orifice, said gasket being of greater diameter than the orifice and of lesser diameter than the piston and located forward of the piston whereby a liquid trap is formed by the cooperative relationship of said bore, piston and gasket when the piston and gasket are in advanced position, a button slidable in said orifice, said button having a diameter sufficiently less than the diameter of the orifice to provide a restricted passage for liquid through the orifice past the button, a spring urging said valve means closed, means supporting said spring, said button, piston and valve means being interconnected for unitary movement whereby when the button is depressed to one extreme the piston is free of the bore and the valve means opens the orifice, and when the button is abruptly released after being depressed the piston will forcibly propel any liquid in the trap outwardly through the orifice.

MAURICE TRAPET.

REFERENCES CITED

The following references are of record in the file of this patent:

UNITED STATES PATENTS

| Number | Name | Date |
|---|---|---|
| 997,939 | Wahl | July 11, 1911 |
| 1,540,082 | Merrill | June 2, 1925 |
| 1,559,484 | Watrous | Oct. 27, 1925 |
| 1,697,725 | Guerin | Jan. 1, 1929 |
| 1,731,250 | McAtree | Oct. 15, 1929 |
| 1,989,738 | Carson | Feb. 5, 1935 |
| 2,242,876 | Winters | May 20, 1941 |
| 2,296,500 | Cain | Sept. 22, 1942 |